United States Patent [19]
Johnstone et al.

[11] Patent Number: 5,898,680
[45] Date of Patent: Apr. 27, 1999

[54] SYSTEM FOR PROVIDING LOCATION-SPECIFIC DATA TO A USER

[75] Inventors: Robert L. Johnstone, West Boothbay Harbor, Me.; S. Joseph Campanella, Gaithersburg, Md.

[73] Assignee: WorldSpace, Inc., Washington, D.C.

[21] Appl. No.: 08/746,018

[22] Filed: Nov. 5, 1996

[51] Int. Cl.⁶ .................................................. H04B 10/105
[52] U.S. Cl. ........................... 370/316; 455/3.2; 701/213; 340/995; 380/9
[58] Field of Search ..................................... 370/310, 316, 370/312, 313, 486; 455/3.2, 6.3, 456, 457, 427, 12.1; 342/352, 357; 364/420; 701/300, 213, 216; 340/990, 995; 380/26, 9, 21; 902/2

[56] References Cited

U.S. PATENT DOCUMENTS

| | | | |
|---|---|---|---|
| 4,467,424 | 8/1984 | Hedges et al. .............................. | 463/26 |
| 4,785,463 | 11/1988 | Janc et al. .................................... | 375/1 |
| 5,235,633 | 8/1993 | Dennison et al. ....................... | 455/456 |
| 5,303,393 | 4/1994 | Noreen et al. ............................ | 455/3.2 |
| 5,331,561 | 7/1994 | Barrett et al. ............................ | 364/447 |
| 5,365,450 | 11/1994 | Schuchman et al. .................... | 364/449 |
| 5,365,451 | 11/1994 | Wang et al. .............................. | 364/449 |
| 5,414,432 | 5/1995 | Penny, Jr. et al. ...................... | 342/357 |
| 5,422,813 | 6/1995 | Schuchman et al. .................... | 364/449 |
| 5,430,656 | 7/1995 | Dekel et al. .............................. | 364/449 |
| 5,455,823 | 10/1995 | Noreen et al. ........................... | 370/312 |
| 5,499,032 | 3/1996 | Kelley et al. ............................ | 342/357 |
| 5,524,081 | 6/1996 | Paul ......................................... | 701/300 |
| 5,596,494 | 1/1997 | Kuo ......................................... | 364/420 |
| 5,636,245 | 6/1997 | Ernst et al. .............................. | 375/259 |
| 5,689,245 | 11/1997 | Noreen et al. ...................... | 340/825.44 |

OTHER PUBLICATIONS

Stuart F. Brown, "Timely Warning", *Popular Science*, Jul. 1996.

*Primary Examiner*—Hassan Kizou
*Attorney, Agent, or Firm*—Roylance, Abrams, Berdo & Goodman, LLP

[57] ABSTRACT

An FDMA/TDM satellite-based digital broadcast system is used to provide digital maps and other types of data to users at remote locations. User selection of the desired data is achieved by monitoring the TDM downlink channels of the broadcast system in accordance with a predetermined schedule or until a specific identification code is detected. The user terminals are equipped with Global Positioning System (GPS) receivers which allow the positions of the users to be determined. Based on the user positions, the user terminals are able to convert general data to location-specific data tailored to the needs of the user. The general data may comprise a digital map covering a wide geographic area, and the location-specific data may comprise a map covering a portion of the geographic region where the user is located.

20 Claims, 8 Drawing Sheets

SYSTEM FOR PROVIDING LOCATION-SPECIFIC DATA TO A USER

CROSS REFERENCE TO RELATED APPLICATIONS

Related subject matter is disclosed and claimed in a co-pending U.S. patent application Ser. No. 08/569,346, filed by S. Joseph Campanella on Dec. 8, 1995; in a co-pending U.S. Patent Application of S. Joseph Campanella, filed on Nov. 5, 1996 under Ser. No. 08/746, 019 and entitled "Direct Radio Broadcast Receiver Providing Frame Synchronization and Correlation for Time Division Multiplexed Transmissions" in a co-pending U.S. Patent Application of S. Joseph Campanella, filed on Nov. 5, 1996 under Ser. No. 08/746,020 and entitled "Direct Radio Broadcast Receiver for Time Division Multiplexed Transmission" in a co-pending U.S. Patent Application of S. Joseph Campanella, filed on Nov. 5, 1996 and entitled "System for Formatting Broadcast Data for Satellite Transmission and Radio Reception" in a co-pending U.S. Patent Application of S. Joseph Campanella et al, filed on Nov. 5, 1996 under Ser. No. 08/746,069 and entitled "System for Managing Space Segment Usage Among Broadcast Service Providers" in a co-pending U.S. Patent Application of S. Joseph Campanella, filed Nov. 5, 1996 under Ser. No. 08/746,070 and entitled "Satellite Payload Processing System for Switching Uplink Signals to Time Division Multiplexed Downlink Signals" in a co-pending U.S. Patent Application of S. Joseph Campanella, filed on Nov. 5, 1996 under Ser. No. 08/746,071 and entitled "Satellite Payload Processing System Using Polyphase Demultiplexing and Quadrature Phase Shift Keying Demodulation" and in a co-pending U.S. Patent Application of S. Joseph Campanella, filed on Nov. 5, 1996 under Ser. No. 08/746, 072 and entitled "Satellite Payload Processing System Providing On-Board Rate Alignment" all of said applications being expressly incorporated herein by reference.

FIELD OF THE INVENTION

The present invention relates generally to the transmission and reception of data, and is particularly concerned with a system for providing location-specific data to a remotely located user by combining a broadcast receiver with a geographic position determination unit.

BACKGROUND OF THE INVENTION

There are many situations in which a user at a remote location wishes to receive updated information that is specifically tailored to the user's needs. For example, an aircraft pilot may require a current weather map or aeronautical chart for a specific flight path before beginning a flight, or the crew of an ocean-going vessel may require an updated nautical chart showing local harbor anchorages, entrances, channels or the like. Similarly, hikers, skiers and other individuals engaged in outdoor sporting activities may wish to obtain current topographical maps of the local region in which the activity will take place.

Typically, nautical charts and topographical maps are made available in hard copy form and are updated on a relatively infrequent basis. Weather maps (for which frequent updating is essential) have in some cases been made available to pilots and others by facsimile or modem, but the requirement for access to a facsimile machine or computer may prevent the user from obtaining updated weather maps as frequently as might be desired. Moreover, in all of these cases, the maps are generally designed to cover a wide geographic area and are not tailored to the needs of any specific user.

There currently exists a satellite-based position determination system known as the Global Positioning System (GPS), in which a number of satellites in orbits above the earth broadcast precise timing signals that can be received by mobile receivers in aircraft, ships and land vehicles to provide position information using triangulation techniques. In addition to providing latitude and longitude information, GPS receivers often use various types of onboard data storage devices (such as disks and cartridges) to provide map displays that are combined with the satellite-derived GPS position data. This allows the position of the user to be shown graphically on a moving map, for example. While these receivers are very useful for navigation, the map data must be updated frequently (typically by obtaining new disks or cartridges through a subscription service) in order to remain useful. Even with frequent updating, some types of map data (such as weather map data) cannot be effectively provided in this way.

SUMMARY OF THE INVENTION

In view of the foregoing disadvantages and limitations, it is an object of the present invention to provide a system and method for distributing data (particularly, but not exclusively, map data and other types of image data) to users by means of a radio frequency link, so that updated data can be obtained as frequently as needed.

A further object of the present invention is to make it possible for a user to obtain data, particularly map data, that is specific to the user's location.

A further object of the present invention is to use a satellite direct radio broadcast system to provide map data and other types of data, on demand, to users located throughout a large geographical area.

It is a still further object of the present invention to utilize a position determination unit, such as a GPS receiver, to allow general map data or other data to be made location-specific for a particular user.

It is a still further object of the present invention to provide a system and method for allowing remote users to obtain data selectively, without requiring two-way communication between the users and the source of the data.

It is yet another object of the present invention to make it possible for maps and other types of data to be made available to users who pay for the data, and to prevent unauthorized users from obtaining access to the data.

These and other objects of the present invention are achieved, in part, by providing remote users with receiver terminals which incorporate both broadcast receivers and position determination units. The broadcast receivers receive general data (that is, data potentially usable by users located at different geographic locations) from a broadcast station, and the position determination units allow the general data to be converted to location-specific data that is tailored to the needs of the user. A relay satellite, such as a direct radio broadcast satellite, may be used to relay the general data from the broadcast station to the receiver terminals.

In one aspect, therefore, the present invention is directed to a system for providing location-specific data to a user. The system comprises a broadcast station for transmitting general data potentially usable by a plurality of users located at different geographic positions, and a relay satellite for relaying the data from the broadcast station to the plurality of users. The system also includes a receiver terminal that is provided for each of the users. The receiver terminal includes a broadcast receiver for receiving the general data from the relay satellite, a position determination unit for determining the geographic position of the user, and a processor for converting the general data to location-specific data based on the geographic position of the user as determined by the position determination unit.

In another aspect, the present invention is directed to a receiver terminal for providing location-specific data to a user. The receiver terminal comprises a broadcast receiver for receiving general data transmitted by a broadcast station, and a position determination unit for determining the geographic position of the receiver terminal. The receiver terminal also comprises a processor for converting the general data to location-specific data based on the geographic position of the receiver terminal.

In a still further aspect, the present invention is directed to a method for providing location-specific data to a user. The method comprises the steps of transmitting general data potentially usable by a plurality of users located at different geographic positions, receiving the general data at one of the user locations, determining the geographic position of the user, and converting the general data to location-specific data based on the geographic position of the user.

BRIEF DESCRIPTION OF THE DRAWINGS

The various objects, advantages and novel features of the present invention will be more readily apprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENT

Figure 1:
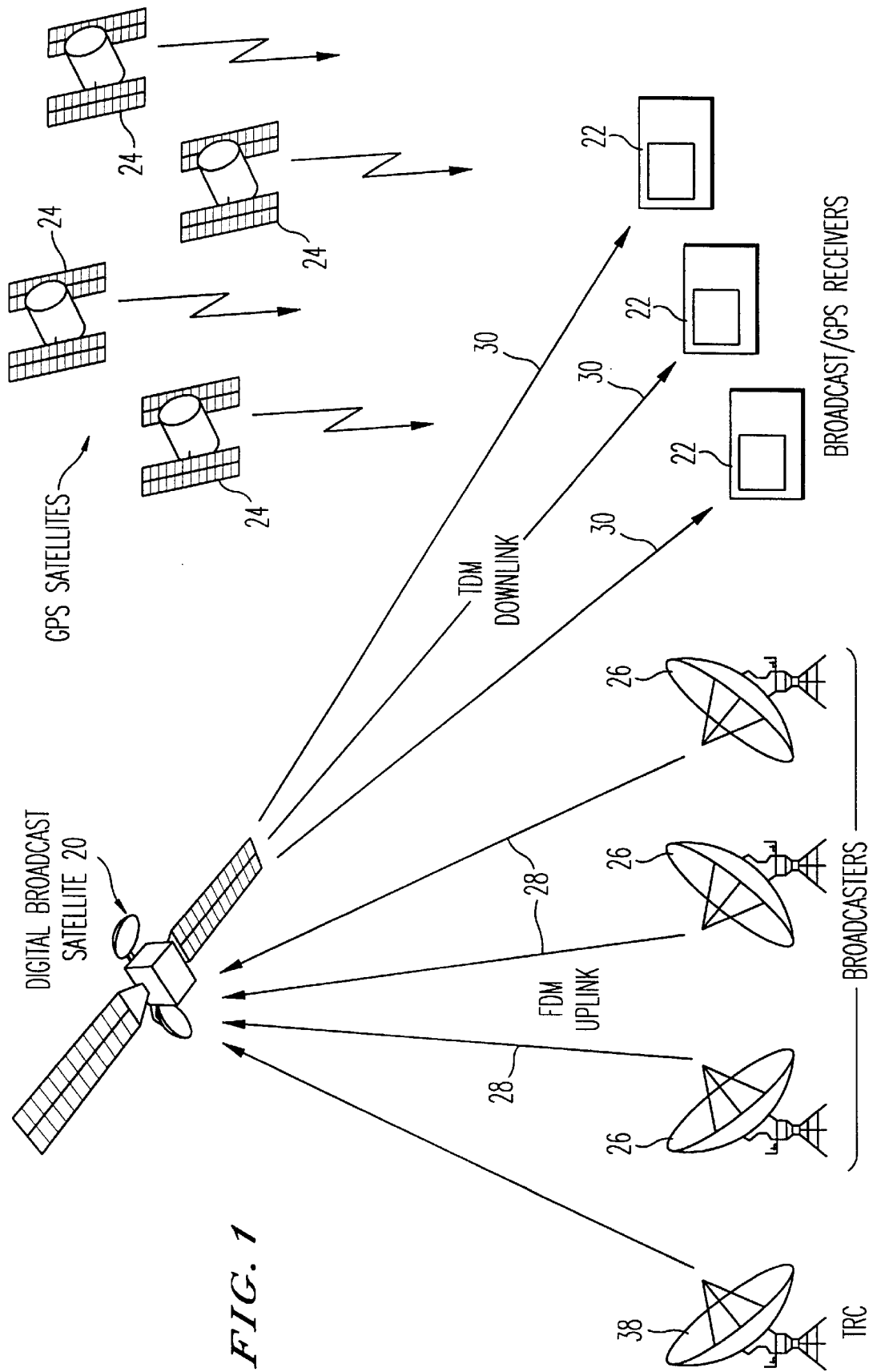
FIG. 1 is a diagrammatic illustration of the manner in which location-specific data can be provided to users through a satellite direct radio broadcast system in accordance with a preferred embodiment of the present invention.

A system for providing location-specific data to a user in accordance with the present invention is preferably implemented in connection with a satellite direct radio broadcast system of the type described in the aforementioned copending U.S. patent application Ser. No. 08/569,346, filed Dec. 8, 1995. The direct radio broadcast system preferably consists of three geostationary satellites (one of which is indicated at 20 in FIG. 1), low cost radio receivers or user terminals 22, and associated ground networks. For position determination purposes, the existing constellation of Global Position System (GPS) satellites 24 is also used in the preferred embodiment of the present invention. The manner in which the GPS satellites 24 and their associated receivers operate is well known and need not be described herein.

The preferred satellites 20 of the direct radio broadcast system cover the African-Arabian region, the Asian region and the Caribbean and Latin American regions from the following geostationary orbits:

21° E orbital location, providing service to Africa and the Middle East.

95° W orbital location, providing service to Central and South America.

105° W orbital location, providing service to Southeast Asia and the Pacific rim.

Coverage for other areas, such as North America and Europe, can be provided with additional satellites.

The direct radio broadcast system preferably uses the frequency band of 1467 to 1492 MHz, which has been allocated for Broadcasting Satellite Service (BSS) Direct Audio Broadcast (DAB) at WARC 92, that is, in accordance with resolutions 33 and 528 of the ITU. The broadcasters 26 use feeder uplinks in X band, from 7050 to 7075 MHz.

The direct radio broadcast system uses digital audio coding techniques. Each satellite delivers digital radio audio signals having qualities equivalent to AM monaural, FM monaural, FM stereo and CD stereo throughout its respective coverage area, together with ancillary data such as paging, video and text transmissions directly to the radios. The system may also deliver multimedia services such as large database downloads to PCs for business applications, map and printed text information for travelers (as described in more detail hereinafter), and even color to augment audio programs for advertising and entertainment.

System broadcasters organize their services in terms of program channels, each consisting of one or more 16 kilobit per second (kbps) prime rate channels. The number of prime rate channels per program channel can range from 1 to 8, thus yielding a program channel bit rate of 16 to 128 kbps in 16 kbps increments. Each broadcaster selects the number of 16 kbps prime rate channels in accordance with the broadcaster's specific application. For each 16 kbps increment, there is also a service control header that carries 519 bits per second, bringing the total bit rate per prime channel to 16.519 kbps.

To protect the broadcaster's program channel, a forward error correction (FEC) method is used. It comprises a Reed Solomon (255,223) coder concatenated with an interleaver, and a rate ½ Viterbi constant length coder. This error correction coding (together with the addition of a sync header) elevates the prime rate channel to 19 kbps.

Each satellite 20 is preferably equipped with three downlink spot beams, having beamwidths of about 6°. Each beam covers approximately 14 million square kilometers within power distribution contours that are 4 dB down from beam center and 28 million square kilometers within contours that are 8 dB down. The beam center margin may be 14 dB based on a receiver gain-to-temperature ratio of −13 dB/K.

Each satellite 20 carries two types of payloads. One is a "processing" payload that regenerates the uplink signals and assembles 3 TDM downlink carriers, and the other is a "transparent" payload that repeats the uplink signals on 3 TDM downlink carriers. The TDM signals from the two payloads are each transmitted in 3 beams, with the processed and transparent signals in each beam having opposite circular polarization (LHCP and RHCP). Each TDM downlink signal carries 96 prime rate channels in assigned time slots. To a radio receiver, all of the TDM downlink signals appear the same, except for carrier frequency. The total capacity per satellite is 2×3×96=576 prime rate channels.

FIG. 1 illustrates the overall operation of a location-specific data delivery system in accordance with a preferred embodiment of the present invention. In the case of the satellite processing payload, uplink signals 28 issue from broadcasters via individual frequency division multiple access (FDMA) channels from broadcast stations 26 located anywhere within the terrestrial visibility of the satellite 20 with elevation angles higher than 10°. Each broadcaster has the ability to uplink directly from its own facilities to one of the satellites 20 placing one or more 16 kbps prime rate channels on the FDMA carriers. Alternately, broadcasters which have no capacity for direct access to the satellite 20 may have access through a hub station. Use of FDMA for the uplink offers the highest possible flexibility between multiple independent broadcast stations.

Conversion between uplink FDMA and downlink multiple-channel-per-carrier, time division multiplex (MCPC/TDM) in the direct radio broadcast system of FIG. 1 is achieved on board the satellite 20 by an on-board processor. At the satellite 20, each prime rate channel transmitted by a broadcast station 26 is demultiplexed and demodulated into individual 16 kbps baseband signals. Individual channels are routed via a switch to one or more of the downlink beams 30, each of which is a single TDM signal. This baseband processing provides a high level of channel control in terms of uplink frequency allocation and channel routing between uplink and downlink. Uplink signals are received in the satellite in X band and converted to L band by the on-board processor. The downlinks 30 to the user terminals 22 use MCPC/TDM carriers. One such carrier is used in each of the three beams on each satellite 20.

For the transparent payload, the TDM signals are assembled at a broadcast station and appear in precisely the same structure as do those assembled on board the satellite 20 by the processing payload. The TDM signal is sent to the satellite in the X band and is repeated in the L band in one of the three downlink beams. The power level is the same for downlink TDM signals generated by the processing payload.

As will be described hereinafter, signals from the GPS satellites 24 are also received by the user terminals 22 and are used by the terminals 22 to determine their geographic positions. This allows each user terminal 22 to convert general data received from the broadcasters 22 to location-specific data tailored to the needs of the user.

Figure 2:
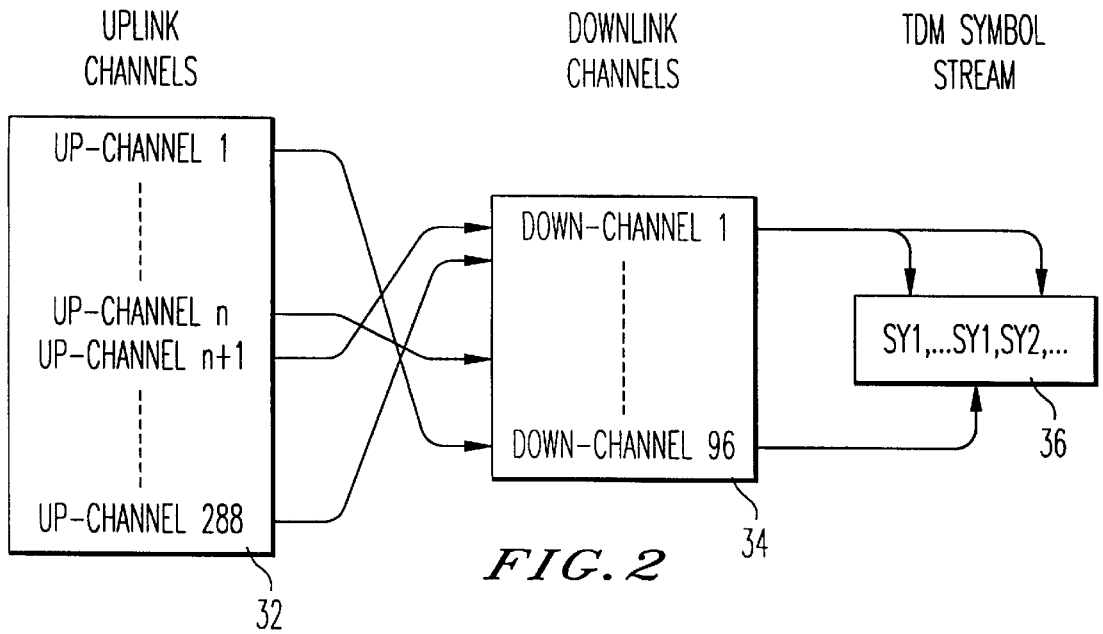
FIG. 2 illustrates the reallocation of information from uplink frequency division multiple access channels into a downlink time division multiplexed channel in a satellite direct radio broadcast system of the type shown in FIG. 1.

FIG. 2 illustrates the on-board re-allocation of prime rate channels from uplink frequency division multiple access channels into a downlink MCPC/TDM channel in the processing payload of the satellite 20 of FIG. 1. The overall uplink capacity is preferably between two hundred eighty-eight (288) and three hundred eighty-four (384) prime rate uplink channels 32 of 16.519 kbps each. Ninety-six (96) prime rate channels 34 are selected and multiplexed for transmission in each downlink beam 36, time division multiplexed onto a carrier of approximately 2.5 MHz bandwidth. Each uplink channel may be routed to all, some or none of the downlink beams. The order and placement of prime rate channels in a downlink beam is fully selectable via a command link from a telemetry, range and control (TRC) facility 38, shown in FIG. 1.

The carrier frequencies in each downlink beam 36 are different to enhance beam-to-beam isolation. Each TDM downlink channel is operated in the satellite payload at saturation, giving the highest possible power efficiency in terms of link performance. Use of single carrier per transponder operation achieves maximum efficiency in the operation of the satellite communication payload in terms of conversion of solar power into radio frequency power. This is far more efficient than techniques requiring simultaneous amplification of a multiplicity of FDM carriers. The system produces high receive margins suitable for stationary and mobile reception indoors and outdoors.

The system carries out audio source coding using MPEG 2.5, Layer 3 which achieves the cited qualities at bit rates of 16, 32, 64 and 128 kbps, respectively, and also includes the capability to perform 8 kbps coding. Image coding is carried out using the JPEG standard. Error rates over the system are less than $10^{-10}$ and thus are suitable for high quality digital image and data transmission for multimedia services. The MPEG 2.5, Layer 3 coding offers a better bit rate efficiency than the previous MPEG 1, Layer 2 (Musicam) or MPEG 2 standards for the same audio quality. For audio broadcasts, the digitally coded source bit rates are:

8 kbps for utility monophonic voice;

16 kbps for non-utility monophonic voice;

32 kbps for monophonic music, with near FM quality;

64 kbps for stereophonic music, with near FM quality; and 128 kbps for stereophonic music, with near CD quality.

In the preferred implementation of the satellite direct radio broadcast system, each satellite has the capacity to transmit a total of 3072 kbps per beam (including the 2 TDM carriers for the processing and transparent payloads, respectively), which may be any combination of the above audio services. This corresponds to a capacity per beam of:

192 monophonic voice channels; or 96 monophonic music channels; or 48 stereophonic music channels; or 24 CD stereophonic music channels; or any combination of the above signal qualities.

The overall satellite direct radio broadcast system delivers the digital signals with a bit error rate (BER) of $10^{-4}$ or better, providing the various service qualities previously defined. For each downlink beam in L band transmitted by the satellites, the Edge Of Coverage EIRP of the TDM carrier is 49.5 dBW. This EIRP, together with specific Forward Error Correction, insures a minimum 9 dB margin for a $10^{-4}$ BER, using the baseline radio receiver antenna. This margin helps combat signal loss due to obstacles in the path between the satellite and the receiver, providing full quality reception in the intended coverage area.

Radio receivers in obstructed locations can be connected to a high gain antenna, or to an antenna located in an unobstructed position. For example, reception in large buildings may need a common roof antenna with indoor retransmission for the entire building, or individual reception antennas near a window. At the 4 dB down contour of the earth coverages, the channels have an estimated margin of 10 dB relative to the power density needed to deliver a bit error rate of $10^{-4}$. At beam center this margin estimate is 14 dB.

The operating margin of the system does not change for the higher bit rates. Within the 4 dB contour, most radios will view the satellite at elevation angles of greater than 60°, making interference from structures virtually nil. In some beams, within the 8 dB contour the elevation angle to the satellite will be greater than 50°, which may experience occasional interference due to reflections or blockage from structures. Line of sight reception even at low elevation angles (10° to 50°) is always possible with small 8 dBi gain antennas in some beams pointed toward the horizon.

The direct radio broadcast system includes a baseband processing payload in the satellite 20. Baseband processing allows improved system performance for uplink and downlink link budgets, management of broadcast stations, and control of the downlink signals.

Figure 3:
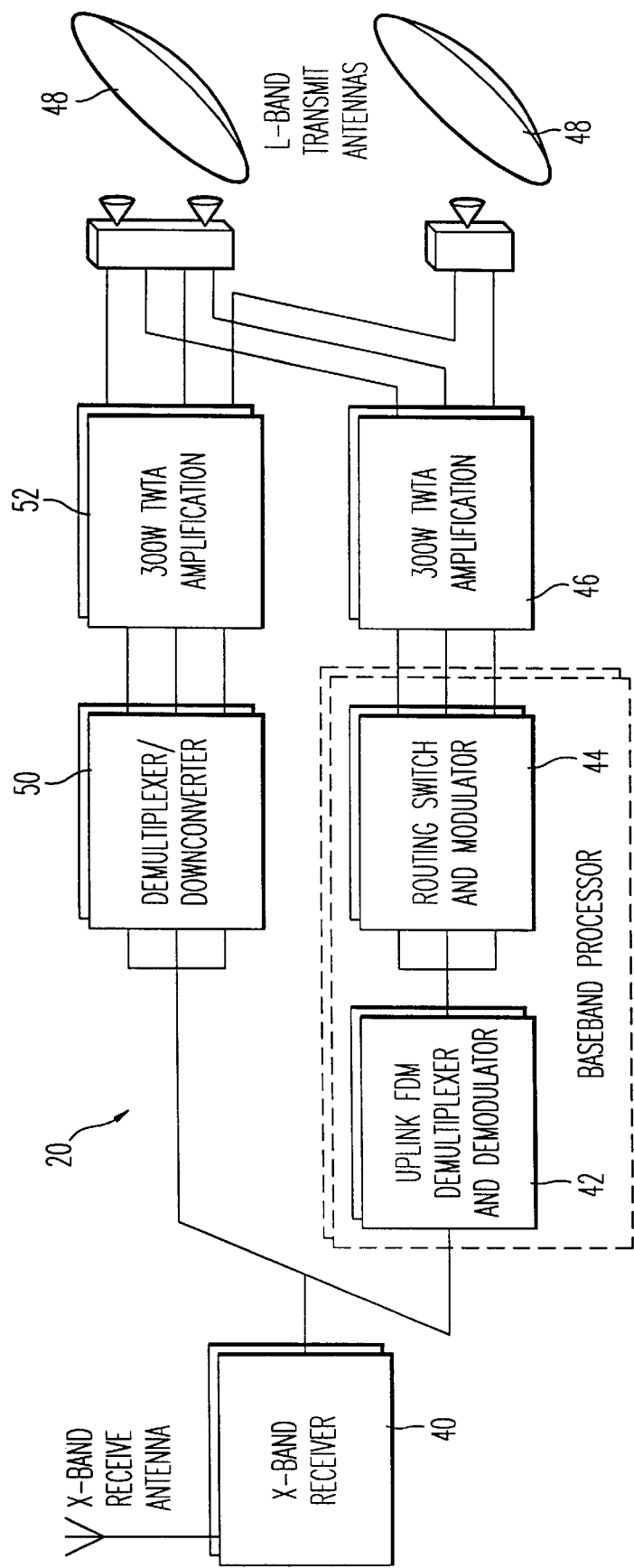
FIG. 3 illustrates the manner in which on-board satellite signal processing may be carried out in a satellite direct radio broadcast system of the type shown in FIG. 1.

FIG. 3 illustrates satellite signal processing in the preferred satellite direct radio broadcast system. The coded prime rate uplink carriers are received at an X-band receiver 40. A polyphase demultiplexer and demodulator 42 receives the 288 individual FDMA signals in 6 groups of 48, generates six analog signals on which the data of the 288 signals is divided into 6 time multiplexed streams, and performs demodulation of the serial data on each stream. A routing switch and modulator 44 selectively routes individual channels of the serial data into all, some or none of three downlink signals, each carrying 96 channels, and further modulates them onto the three downlink L-band TDM signals. Traveling wave tube amplifiers 46 boost the power of the three downlink signals, which are radiated to earth by L-band transmit antennas 48. The satellite also includes a transparent payload comprising a demultiplexer/ downconverter 50 and an amplifier group 52, which are configured in a conventional "bent pipe" signal path to frequency convert uplink TDM/MCPC signals for retransmission at L band.

High redundancy in the spacecraft receivers, digital processors and output high power amplifiers guarantees a 12 year life for each satellite 20. Also, there is enough position keeping fuel to maintain each satellite 20 to a location within ±0.1° of its assigned orbit position for 15 years.

The time division multiplex frames have a duration of 0.138 second, each marked by a 96 symbol synchronization word. The downlink MCPC/TDM carrier has a rate of 1.84 million QPSK symbols per second.

The satellites 20 are operated by a ground control segment and managed according to traffic requirements by a mission control segment during the orbit lifetime. The bit rates and consequently the service qualities can be mixed in any beam to meet the demand for service. The bit-rate/quality complexion of a service can be easily changed from ground command and can vary at different times of the day. In the preferred embodiment, channel allocation may be changed on an hour-by-hour basis according to a program schedule established twenty-four hours in advance. Radio receivers, relying on ensemble information included in the TDM frame and in each prime rate channel, will automatically select those prime rate channels necessary to generate the user-selected digital audio program or other digital service program.

Figure 4:
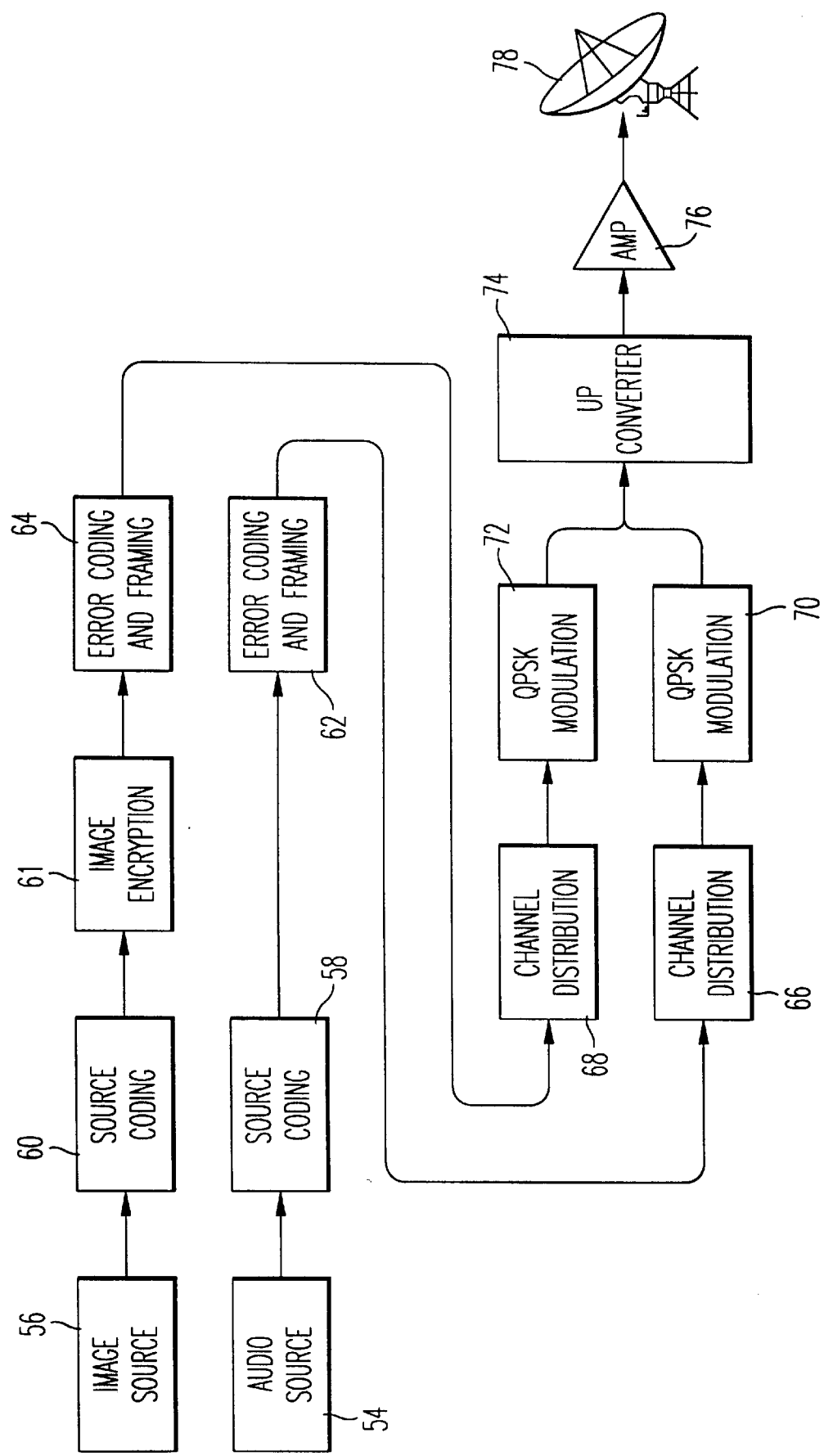
FIG. 4 is a block diagram illustrating the manner in which image data may be combined with audio data at a broadcast station and uplinked to the digital broadcast satellite of FIGS. 1–3.

A block diagram of a broadcast station 26 which may be used in connection with the present invention is illustrated in FIG. 4. Two sources are shown in FIG. 4, one source 54 providing audio programming and the second source 56 providing image data which may be desired by certain users.

(It will be understood that this arrangement is merely exemplary, and that the broadcast station 26 may transmit only audio programming or only image data or other broadcast services, if desired. Moreover, the number of sources could be greater than two, and both audio and image data could be produced by the same source in some cases.) The image data may consist of weather maps, topographical maps, political boundary maps, road maps, nautical or aeronautical charts, satellite or radar generated images, or the like. Different types of image data may be sent at different times (e.g., aeronautical charts may alternate with nautical charts), or the same type of image data may be sent on a continuously updated basis. For the purposes of the present invention, it is desirable (although not essential) that successive blocks of image data be sent in accordance with a predetermined schedule that is known to the users in advance, so that the users can selectively access desired blocks of image data without requiring a two-way communication link with the broadcast station. Thus, for example, if weather maps relating to different geographic areas are transmitted sequentially at known times, a user in a particular geographic area need merely wait until the assigned time (obtained from a published schedule or the like) to obtain the weather map that corresponds to the user's specific geographic area.

As will be apparent from FIG. 4, the processing of digital data from the audio source 54 and from the image source 56 is essentially the same. The audio and images sources 54 and 56 are first subjected to MPEG or JPEG source coding in blocks 58 and 60. The source coded image data is then encrypted in block 61, using an encryption method which can be decrypted using a decryption key. (Optionally, the source coded audio data can also be encrypted, but this is not shown in FIG. 4.) The source coded (and, in the case of the image data, encrypted) digital signals are then forward-error-correction coded in blocks 62 and 64, using a concatenated channel coding scheme comprising a Reed Solomon (255,233) block coder, block interleaving and rate ½ Viterbi convolutional coding.

Use of such a concatenated coding scheme contributes to the low bit error rate achieved over the system. Channel coding multiplies the bit rate needed for transmission by a factor of 2×255/223. Thus, the prime rate is increased to 37.78 kilobits per second after error coding.

Depending on the program channel rate, the symbols of the coded program channels are split among a set of coded prime rate transmit channels. For example, a 128 kbps channel is split into eight prime rate channels as follows:

Symbol 1 into physical channel 1
Symbol 2 into physical channel 2
Symbol 3 into physical channel 3
Symbol 4 into physical channel 4
Symbol 5 into physical channel 5
Symbol 6 into physical channel 6
Symbol 7 into physical channel 7
Symbol 8 into physical channel 8
Symbol 9 into physical channel 1
.
.
.
etc.

A control word is inserted into each coded prime rate channel to identify the program channel to which it belongs and to carry instructions that allow the receiver to recombine the coded prime rate channels to reconstruct the coded program channels. An exemplary eighty (80) bit control word is:

| # Bits | Indication |
|---|---|
| 2 | Quantity Of Related Ensembles<br>(00 = no relation, four related ensembles maximum) |
| 2 | Ensemble Identification Number<br>(00 = Ensemble #1, 11 = Ensemble 4) |
| 4 | Ensemble Type<br>(0000 = Audio, 0001 = Video, 0010 = Data, other types or reserved) |
| 3 | Quantity Of 16 kbps Prime Rate Channels In Ensemble<br>(000 = 1 channel, 001 = 2 channels, . . . , 111 = 8 channels) |
| 3 | Prime Rate Channel Identification Number<br>(000 = channel 1, . . . ,<br>111 = channel 8) |
| 3 | Quantity Of Sub-Ensembles<br>(000 = 1, . . . , 111 = 8) |
| 3 | Quantity Of 16 kbps Prime Rate Channels In Sub-Ensemble<br>(000 = 1, . . . , 111 = 8) |
| 2 | Sub-Ensemble Identification Number<br>(000 = Ensemble #1, . . . , 111 = Ensemble 8) |
| 3 | Ensemble/Sub-Ensemble Blocking<br>(000 = no blocking, 001 = type 1 blocking, . . . ,<br>111 = type 7 blocking) |
| 11 | Reserved |
| 40 | CRC. |

The control word entry for the Quantity of Related Ensembles allows a relationship to be created between various groups of ensembles. For example, a broadcaster may wish to provide related audio, video and data services, such as electronic newspaper with audio text, and additional information. The Ensemple Identification Number identifies the ensemble number of which the channel is a part. The Quantity Of 16 kbps Prime Rate Channels In Ensemble defines the number of prime rate channels in the ensemble. The Quantity Of Sub-Ensembles and Quantity of 16 kbps Prime Rate Channels In Sub-Ensemble defines a relationship within an ensemble, such as, in a CD quality stereo ensemble, use of four prime rate channels for a "Left Stereo" signal and four different prime rate channels for a "Right Stereo" signal. Alternatively, music may be associated with multiple voice signals for announcers, each voice signal in a different language. The Quantity Of 16 kbps Prime Rate Channels In Sub-Ensemble defines the number of prime rate channels in the sub-ensemble. The Sub-Ensemble Identification Number identifies the sub-ensemble of which the channel is a part.

The Ensemble/Sub-Ensemble Blocking bits allow cooperative blocking of broadcast information. For instance, some countries may prohibit advertising for alcohol. Radios produced for that country can be preset with a code, or a code can otherwise be loaded, so that the radio would respond to the blocking signal and block the specific information. The blocking function can also be used to restrict the dissemination of sensitive information (such as military or governmental information), or to restrict revenue-bearing broadcast services to certain users.

Each prime rate channel is organized into frames having at least a channel preamble to provide a timing reference between the broadcast station and the satellite. The preamble may include a unique word to identify the start of the block coding for each frame. The preamble may also include a block of timing bits containing 48 two-bit symbols. When the broadcast station and the satellite are synchronized, the block contains 47 symbols. If, due to differences in oscillators in the satellite and broadcast station, the broadcast station lags behind or moves ahead by one symbol, the block of timing symbols is shortened or lengthened accordingly. All channels may use the same preamble. When a source has been split among multiple prime rate channels, the preambles for all related channels should be coincident. There is no master clock synchronization between separate broadcast stations. Addition of the control word and preamble code raises the transmitted prime channel rate to 38 kilobits per second.

Each coded program source is divided into individual prime rate channels. As an example, the audio source 54 may comprise four prime rate channels, which represents an FM quality stereo signal. Alternatively, audio source 54 may comprise six prime rate channels, which can be used as a "near CD" quality stereo signal, or an FM quality stereo signal linked to a 32 bit data channel (e.g., for transmitting a signal for display on a radio receiver liquid crystal display (LCD)). As a further alternative, the six prime rate channels can be used as a 96 kbps broadcast data channel. The image source may comprise only one 16 kbps channel or several channels. Images may be transmitted in a format allowing 12 million pixels for a high resolution map. This image can be passed to any receiver within about 20 minutes. The time required would be halved every time the number of prime rate channels is doubled. JPEG image coding can be used for such images.

With continued reference to FIG. 4, the prime rate channels are distributed by channel distribution blocks 64 and 68 to QPSK modulation blocks 70 and 72, respectively. Within each QPSK modulation block 70 and 72, a separate QPSK modulator (not shown) modulates each prime rate channel to an intermediate frequency. An upconverter 74 moves the separate prime rate channels to the FDMA uplink band, and the upconverted channels are transmitted through amplifier 76 and antenna 78. Broadcast uplink stations use VSAT signals for transmission of elementary (16 kbps) channels, using small antennas (2 to 3 meters in diameter).

The prime rate uplink channels are transmitted to the satellite 20 on individual Frequency Division Multiple Access (FDMA) carriers. Up to 288 uplink prime rate carriers can be transmitted to the satellite 20 in its global uplink beam. Small broadcasters' earth terminals equipped with 2.4 meter diameter parabolic X-band antennas and 25 watt power amplifiers can easily transmit a 128 kilobit per second program channel (comprising 8 of the prime rate channels) to the satellite 20 from a site in the country originating the program. Alternatively, program channels can be connected to shared uplink earth terminals via leased PSTN terrestrial links. The system has adequate uplink capacity for every country in its world coverage to have its own satellite radio broadcasting channel.

Figure 5:
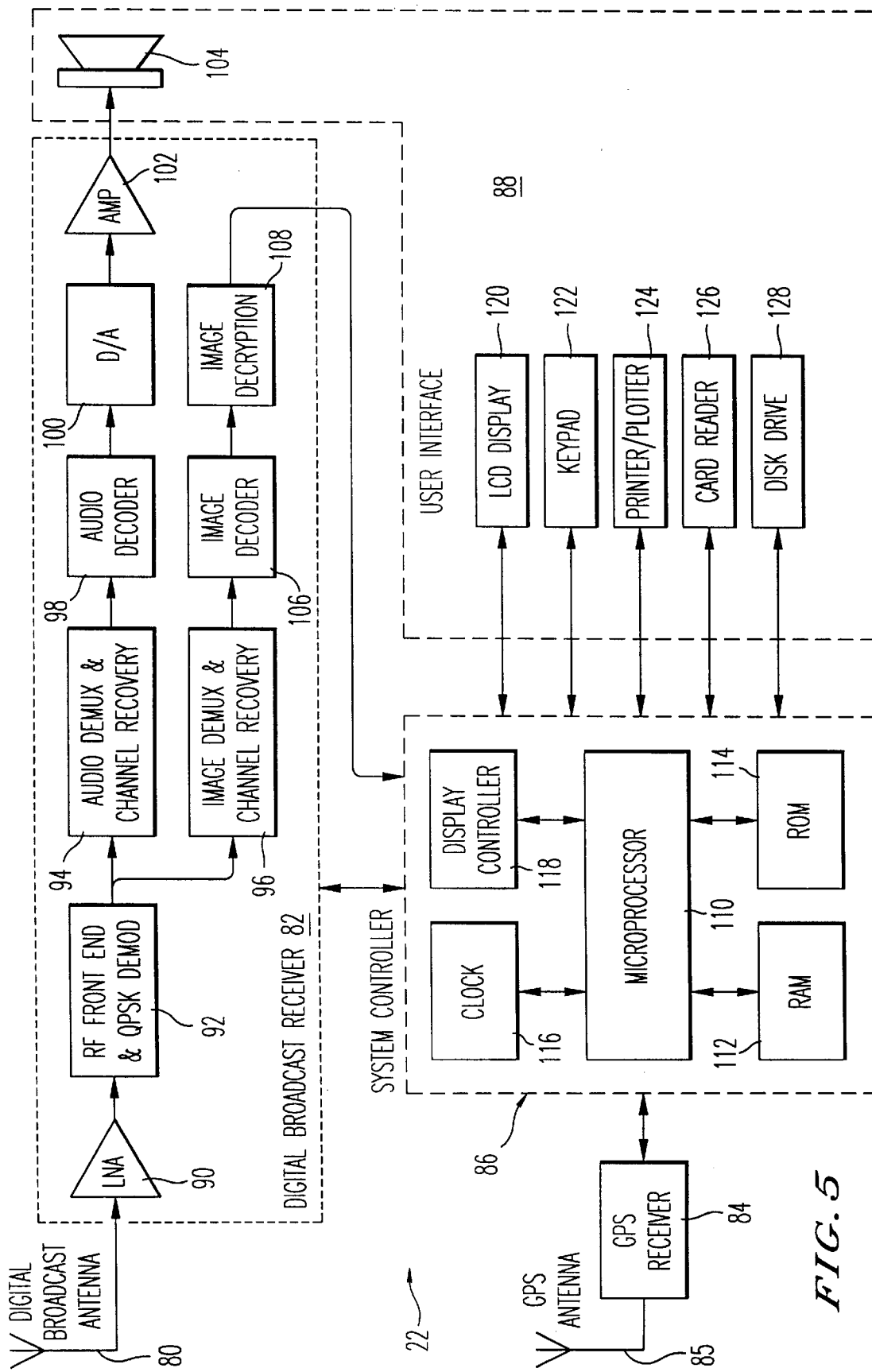
FIG. 5 is a block diagram illustrating the construction of a user terminal which incorporates both a digital broadcast receiver and a geolocation receiver in accordance with a preferred embodiment of the present invention.

A block diagram of one of the user terminals 22 of FIG. 1 is provided in FIG. 5. The user terminal 22 receives the L band signal from the satellite 20, demodulates and extracts from the TDM stream the useful audio or image signal, and reproduces the desired audio or image information. The user terminal may be equipped with a small compact patch antenna 80 having about 4 to 6 dBi gain, which will require virtually no pointing. The user terminal 22 will tune automatically to selected channels. An alternative higher end user terminal may be equipped with an antenna that achieves 10 to 12 dBi of gain. Since such an antenna would be quite directional, it is pointed to achieve best reception. One version of this antenna may be an array of patches. The array may be embedded conformally into the surface of the user terminal case, attached as a lid, or be completely detachable and connected to the user terminal by a thin coax cable a few meters long. Another version of the antenna could be a helix operating in either a broadside or end-fire mode. Pointing is done by rotating the antenna in elevation and azimuth. A detachable antenna can be mounted on a small tripod on the ground or mounted to a window frame and pointed to achieve best reception. A 10 dBi antenna has a beam width of approximately 65° and consequently will be easy to point at the satellite 20 for achieving optimum reception. The directivity of this antenna will further enhance reception in locations where reflections might otherwise cause interference. A phased array, rod shaped antenna with wide beamwidth in one dimension but narrow in the other (i.e., a fan beam) is another alternative. Yet another alternate antenna is a helical antenna for outdoor reception and most indoor reception. In certain environments (mask, concrete or metal buildings), indoor reception may require connection to an external antenna. For reception by mobile user terminals, antennas with as little as 4 dBi of gain may be mounted on the vehicle. A single antenna of this type operates very well in an open location at high elevation angles, devoid of severe multipath reflectors. However, in an area having multipath reflections, such as downtown cities, where elevations are less than 60°, measures may occasionally have to be taken to mitigate the multipath interference. One such measure is to use two or three of the 4 dBi gain antennas in a spatial diversity array mounted at various locations on the vehicle. These can be dynamically added to achieve directivity or combined so as to pick the maximum signal arrival at a given instant. Another alternative is to install a steerable directional antenna with 10 dBi of gain and cause it track the satellite 20. This latter idea is expensive but may be preferable to obtain maximum benefit from the high performance quality offered by the system. As satellite mobile systems come into worldwide use in the next decade, electronically steerable array antennas are expected to drop in price and become generally affordable.

A time division multiplexed, multiple channel per carrier technique is used for downlink transmission to the user terminal 22. Each of the prime rate (16.519 kilobits per second) channels occupies its own time slot in the time division stream. These prime rate channels are combined to carry program channels ranging from 16 to 128 kilobits per second. Use of digital techniques allows for ancillary services to the radio including low rate video, paging, mailing, fax, use of flat display screens, or serial data interfaces. This data and information may be multiplexed within the audio digital signal channels.

Each user terminal 22 can tune to one of the TDM carriers transmitted in one of the beam coverages. As shown in FIG. 5, the user terminal 22 includes a digital broadcast receiver 82 and antenna 80, a GPS receiver 84, an antenna 85, a system controller 86, and a user interface 88. Within the digital broadcast receiver 82, a low noise amplifier 90 boosts the satellite signal, and the boosted signal is received by an RF front end and QPSK demodulator 92. The output of the RF front end and QPSK demodulator 92 is connected to a first time division demultiplexer 94 which recovers the audio prime rate channels, and to a second time division demultiplexer 96 which recovers the prime rate channels carrying image data. Forward error correction (FEC) decoding is also carried out in the blocks 94 and 96. The output of the block 94 is a baseband digital signal carrying audio information, and the output of the block 96 is a baseband digital signal carrying image data.

The instructions needed for the receiver 22 to control recombination of the coded prime channels into the coded program channels are contained in the control words embedded in each coded prime rate channel and in the TDM frames. The recombined coded program channels thus recovered are decoded and deinterleaved to recover the original baseband prime rate bit stream that entered the system at the broadcaster's earth terminal. In the case of audio data, the recovered bit streams are converted back to an analog audio signal by an audio decoder 98 and a digital-to-analog converter 100. The analog signal is boosted by an amplifier 102 and is reproduced by a loudspeaker that forms a part of the user interface 88. The receiver can reproduce various audio qualities ranging from AM monaural to CD stereo depending on the program channel bit rate.

In the case of image data, the recovered bit streams are converted to a displayable format by an image decoder 106. If the image data was encrypted at the broadcast station 26, as will typically be the case where the user is required to pay for the image data, decryption of the image is carried out in block 108. The decrypted data is then provided to the system controller 86. Decryption is performed by adding a random bit pattern to the received broadcast channel frame. The pattern is generated by a pattern generator that is seeded by a key code. The key code can be sent over the system or can be provided by a smart card or debit card. The key code is different for each user.

The system controller 86 has a number of functions. These include monitoring and controlling the operation of the digital broadcast receiver 82, receiving position information from the GPS receiver 84 (for a purpose to be described shortly), controlling the display, printing and storage of received image data, administering decryption keys, and processing user inputs and outputs through the intermediary of the user interface 88. The principal components of the system controller 86 include a microprocessor 110 having suitable amounts of random access memory (RAM) 112 and read-only memory (ROM) 114, a real-time clock 116 and a display controller 118. The display controller 118 controls the formatting of image data (e.g., map data) to an LCD display 120 which forms part of the user interface 88. The user interface 88 also includes a keypad 122, a printer/plotter 124, a card reader 126 and disk drive 128. The keypad 122 is used for selecting broadcast programs, controlling sound levels, making menu selections, and similar functions. The printer/plotter 124 allows the user to receive a hard copy output of any received image data (such as an updated weather map or nautical chart), in addition to viewing the image on the LCD display 120. The card reader 126 is used in connection with a magnetically encoded debit card or smart card to allow the user to obtain access to encrypted image data, as will be described in more detail below. Finally, the disk drive 128 allows data or programs to be loaded into the system controller 86, and also allows received image data to be stored for later viewing or printing. One possible function of the disk drive 122 may be, for example, to allow the system controller 86 to merge image data that is being received in real time by the digital broadcast receiver 82 with preexisting data stored on a magnetic diskette. This is useful in allowing existing maps to be updated by transmitting only the new or modified information, without requiring the entire map to be transmitted.

It will be understood that some or all of the components of FIG. 5 may be incorporated into a single case that is designed for either fixed-site or mobile use. In the latter situation, power may be provided by batteries, solar cells or a generator driven by a spring motor or hand crank. If the user terminal 22 is carried by vehicle such as a boat, aircraft or automobile, power may be provided by the vehicle's power supply. As an alternative to housing all of the components of the user terminal 22 in a single case, the user terminal 22 may be made up of a system or network of separate components interconnected by suitable cables.

Figure 6:
FIGS. 6–8 illustrate three different ways in which image data can be downlinked from the digital broadcast satellite of FIGS. 1–3.
Figure 7:
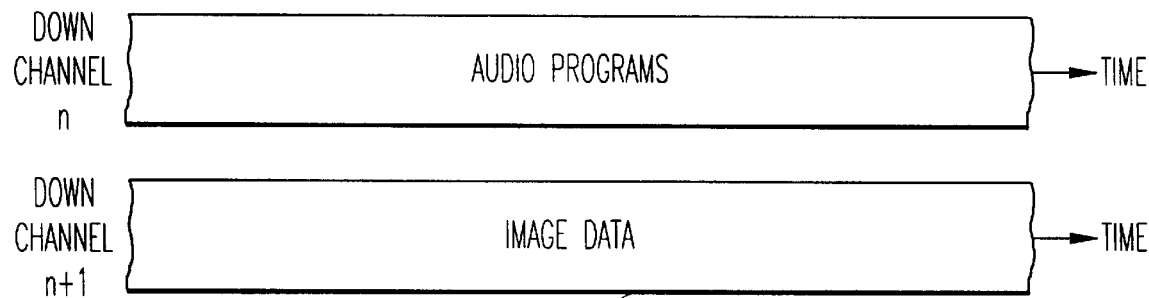
Figure 8:
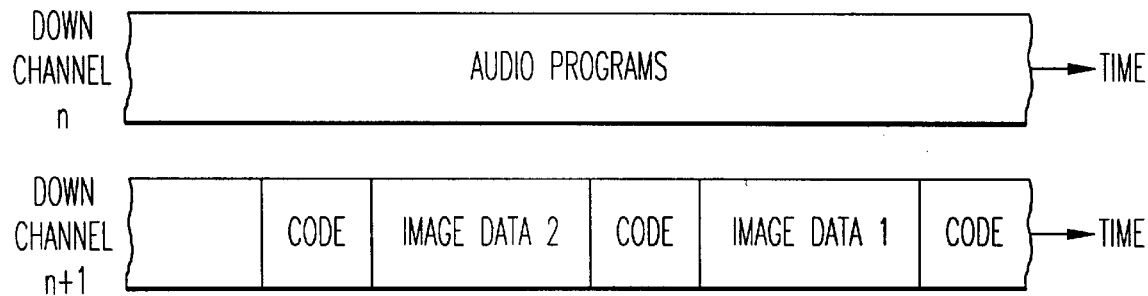

FIGS. 6 through 8 illustrate three different ways in which map data or other types of image data can be transmitted on the downlink TDM channels 30 of FIG. 1. In FIG. 6, the image data is transmitted in the "dead time" between audio programs, and preamble or identification codes are used to distinguish audio data from image data. As an example, audio programs may be transmitted during daylight hours on a given TDM downlink channel (or set of TDM downlink channels), but the same channel (or channels) may carry image data during late evening or early morning hours when there is less demand for audio programs. In FIG. 7, the audio programs and image data occupy different TDM downlink channels and can therefore be transmitted continuously. This option would be desired in cases where the image data consists of weather maps, for example, since such maps must be available on an around-the-clock basis and must be updated very frequently. FIG. 8 is similar to FIG. 7 in that separate TDM channels are used for the audio programs and data, but in this example different types of images are transmitted at different times on the image channel and are separated from each other by preamble or identification codes. Thus, for example, a broadcaster may transmit nautical charts during a first period of time, and aeronautical charts during a second period of time. By tuning to the image channel at the appropriate time (which may be listed in a published schedule), or by programming the user terminal 22 to automatically detect a specific code, the user may select the desired image data for display, printing and/or storage.

Figure 10:
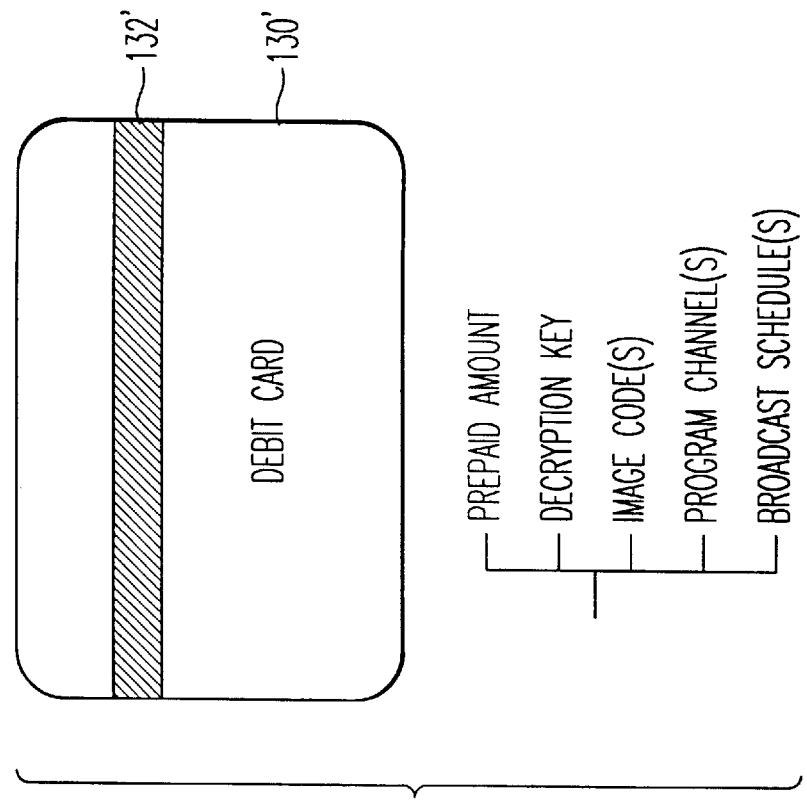
FIGS. 9 and 10 illustrate two possible versions of a debit card which can be used to allow access to image data to users who have paid for the data, and to prevent unauthorized users from obtaining access to the data.
Figure 9:
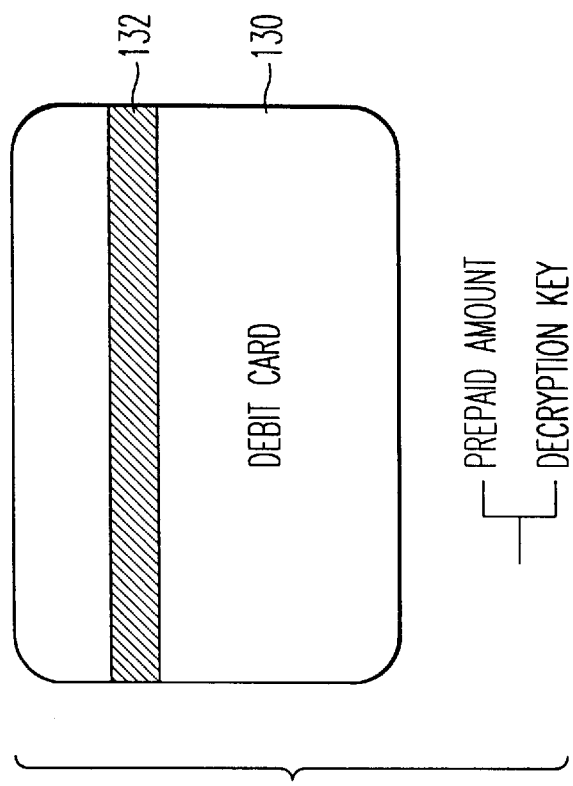

FIGS. 9 and 10 illustrate two possible versions of a magnetically-encoded debit card or smart card which may be used in connection with the user terminal 22 of FIG. 5. In FIG. 9, the debit card 130 contains a magnetic strip 132 which is encoded with a prepaid monetary amount that can be used to purchase maps or other types of images. The magnetic strip 132 also contains a decryption key that is used by the system controller 86 of FIG. 5 to control the decryption of image data that is transmitted by a broadcast station in encrypted form. When the prepaid amount on the debit card 130 is used up, the decryption key is no longer provided to the system controller 86 and the user must obtain a new debit card from the supplier of the image data.

FIG. 10 illustrates a modified debit card 130' which contains a magnetic strip 132' similar to that shown in FIG. 9. In the case of FIG. 10, however, the magnetic strip 132' is encoded not only with a prepaid amount and a decryption key, but also with information (such as image codes, program channels and/or broadcast schedules) that allows the radio receiver 22 to automatically select images that have been requested in advance by the user. For example, if the user has a subscription agreement with a map vendor under which the user obtains updated maps only for selected geographic areas, the image codes and broadcast schedules will cause the radio receiver 22 to automatically receive only those maps without any action by the user. By contrast, the debit card 130 of FIG. 9 requires the user to enter the desired image codes, program channels and/or broadcast schedules into the radio receiver 22 (via the keypad 122), or to manually tune to the desired program channel at the time when a desired image is being transmitted.

Figure 11:
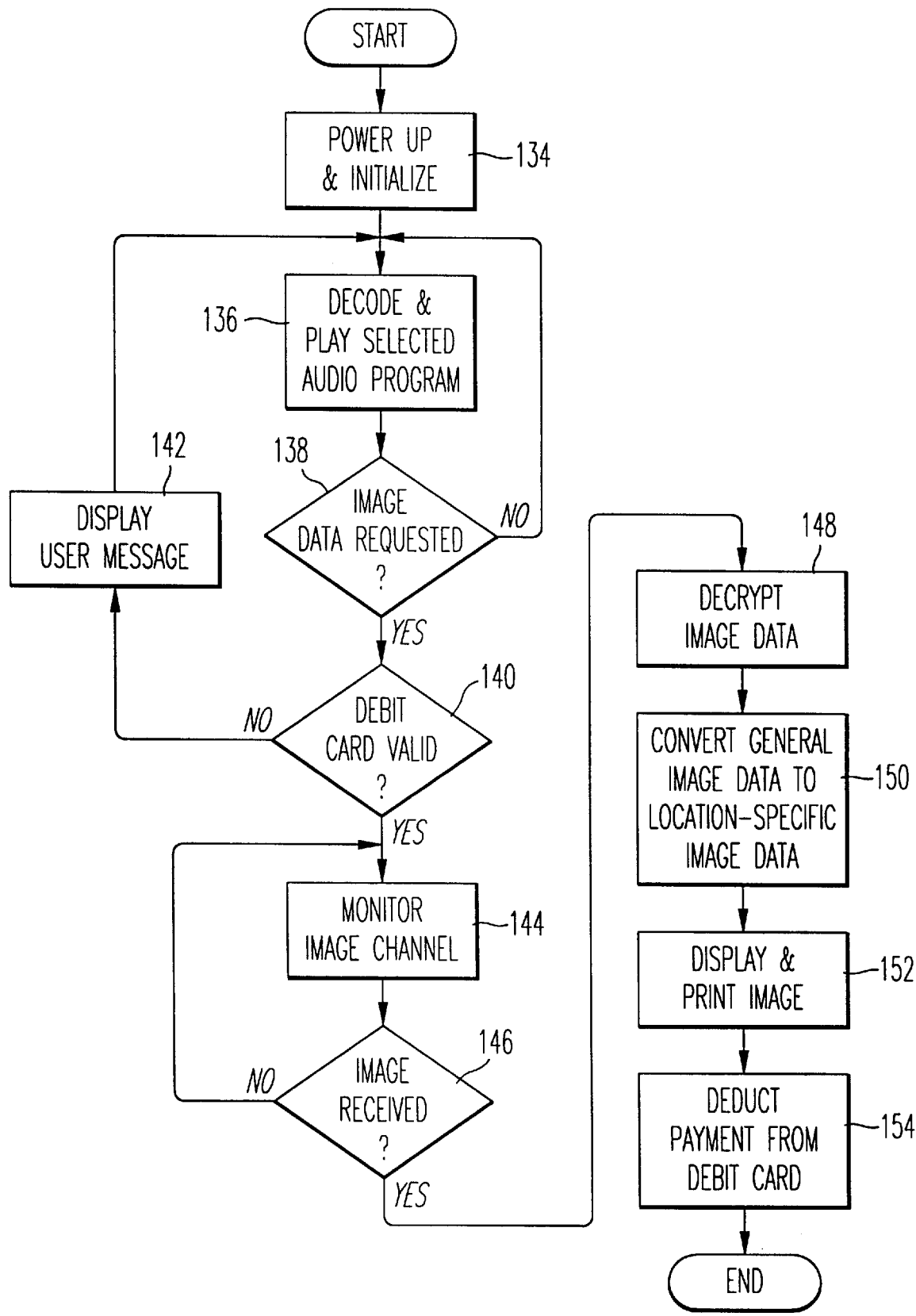
FIG. 11 is a flow chart which summarizes the series of operations carried out by the user terminal of FIG. 5 when audio and image data are received.

FIG. 11 is a flow chart which summarizes the basic series of operations carried out by the user terminal of FIG. 5 when audio and image data are received. It will be understood that, due to the TDM format of the downlink channels, the receiver 22 is capable of receiving and reproducing audio and image data simultaneously. Thus, except in cases where the selected audio program and the desired image data alternate on the same TDM downlink channel (as illustrated in FIG. 6), the user is not required to stop listening to an audio program in order to receive a map or other type of image. As a result, a user who wishes to obtain a weather map, for example, can do so while continuing to listen to weather forecasts over an audio program channel.

With specific reference now to the logic sequence shown in FIG. 11, the first step in the program is a power-up and initialization step that is carried out in block 134. After this step, the program proceeds to block 136, where the receiver 22 decodes and plays an audio program which has been selected by the user. In block 138, the program checks to determine whether image data has been requested by the user. Typically, the user will make such a request by using the keypad 122 of FIG. 5 to choose a menu selection displayed by the LCD display 120. If no image data has been requested, the program returns to block 136 and continues to play the selected audio program. However, if image data has been requested, the program proceeds to decision block 140 and checks to determine whether the user is authorized to receive the requested image data. This determination will typically include a check of the prepaid balance on the user's debit card 130 or 130' (which has been inserted by the user into the card reader 126) and a check of the user's decryption key to be sure that it is valid. If either of these checks fails, a user message is displayed on the LCD display 120 in block 142 to inform the user that proper authorization does not exist.

Assuming that the receiver is found to be properly authorized in decision block 140, the program proceeds to block 144 and begins to monitor the TDM carrier and channel on which the desired image data will appear. Such monitoring may be carried out automatically by the system controller 86 of FIG. 5, using the image codes and broadcast schedules input from the debit card 130'. Alternatively, the user may monitor the image channel manually by observing the channel output on the LCD display 120, and then initiating a data storage or printing operation when the desired image appears. In decision block 146, a check is made (either automatically or manually) to determine whether the desired image has appeared. If not, monitoring continues in block 144 until the image is received. After the image is detected, the program proceeds to block 148 and performs any necessary decryption of the image data using the decryption key on the user's debit card 130 or 130'. Once the image is decrypted, the program proceeds to block 150 and performs any necessary conversion of the general image data received by the user terminal 22 to produce location-specific image data tailored to the needs of the user. This is done by the system controller 86 of FIG. 5 using the geographic position of the user as determined by the GPS receiver 84. The conversion step may be carried out in a variety of ways and may involve partitioning or sectioning of the image, selection of one of several possible images, merging of the image with other image or non-image data, or any other processing, modification or reformatting of the image. Thus, for example, if the image data consists of a weather or topographical map covering a wide geographic area, the conversion step performed in block 150 may involve restricting the image to a smaller geographic area within a predetermined radius of the user's GPS-determined position. Alternatively, or in addition to the formation of a restricted image, the user's position coordinates (e.g., latitude and longitude), direction and speed (for mobile users), and other information may be overlaid onto the image by the system controller 86 based on the received GPS information. The manner in which these types of image conversion may be carried out will be readily apparent to those of ordinary skill in the art, since the principles involved are similar to those used in providing GPS receivers with moving map displays. As an example of another type of image conversion, two or more different maps (such as a land map and a nautical chart) may be merged to form a composite map, using the GPS position data for alignment purposes and/or to produce an overlay of the user's position coordinates or the like on the composite map.

Once the desired image conversion is carried out in block 150, the program proceeds to block 152 and either displays the image on the LCD display 120, prints out the image in hard copy form using the printer/plotter 124, or both, in accordance with input commands provided by the user. The image may also be stored for later viewing on a magnetic diskette using the disk drive 128, and a moving map display may be generated if the user terminal 22 is a mobile terminal. In block 154, payment for the received image is deducted from the user's debit card 130 or 130'. If a sufficient balance remains on the user's debit card, the process of FIG. 11 may be repeated in order to obtain a different image. If the user's debit card balance has reached zero, or an amount which is insufficient to allow another image to be downloaded, the user can purchase another debit card or restore an adequate balance to the existing card at a bank or other institution.

Figure 12A:
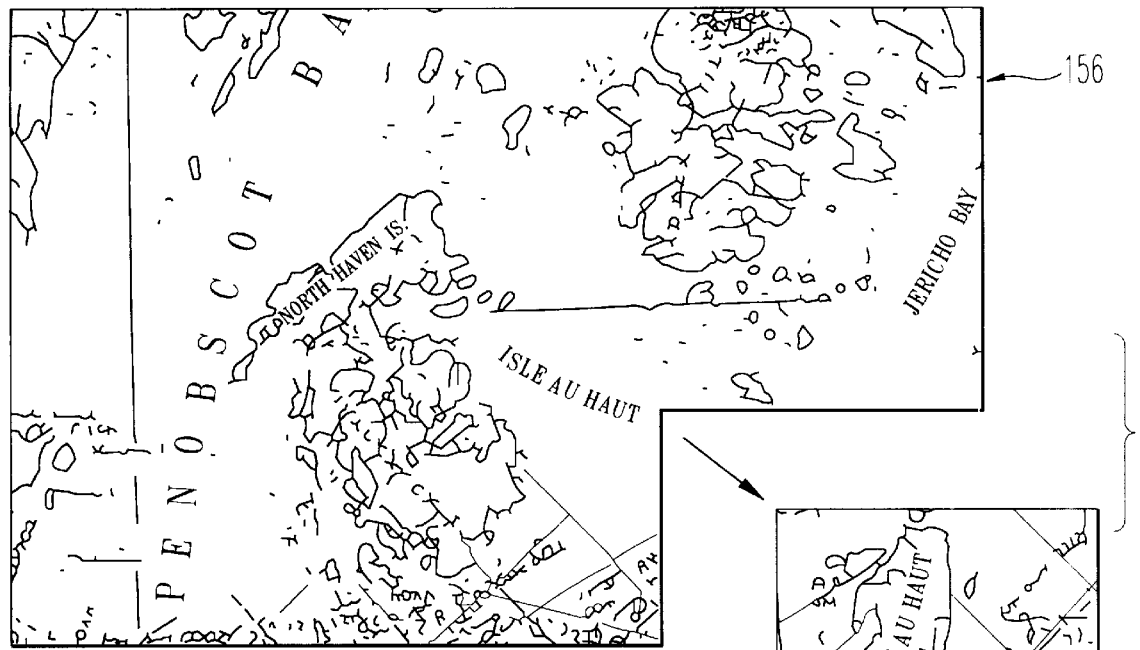
FIG. 12A illustrates a wide geographic area map downloaded to a user terminal.
Figure 12B:
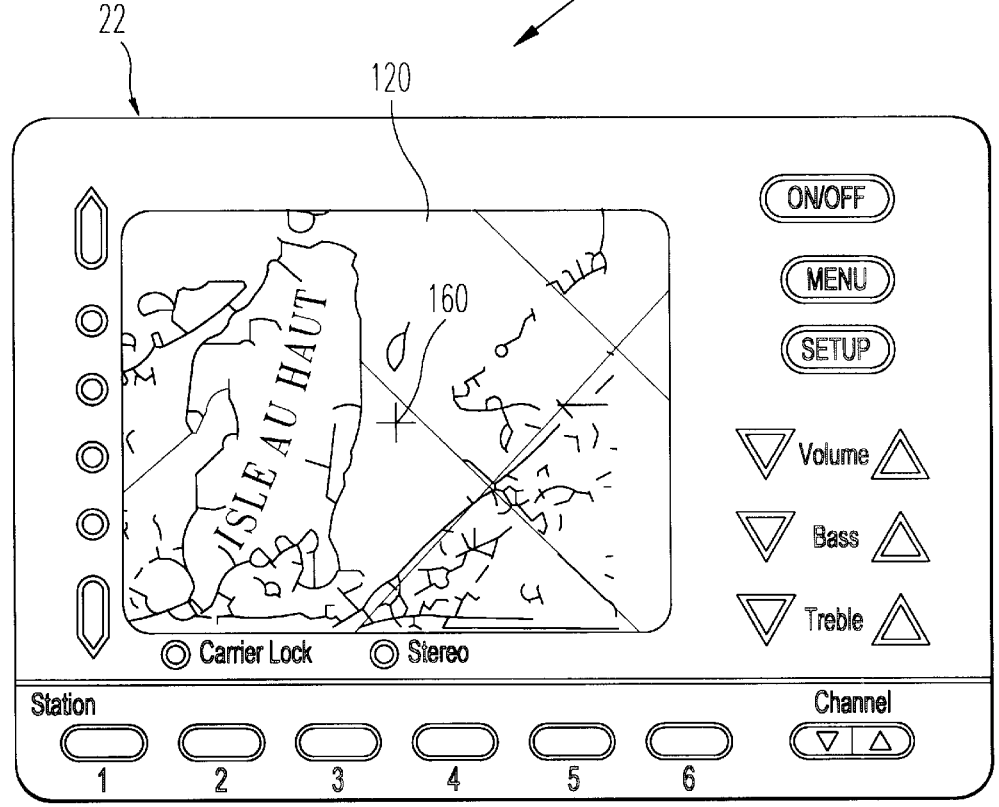
FIG. 12B is a front view of one of the user terminals, illustrating the manner in which a map or other location specific image data may be displayed to the user.

FIG. 12B is an enlarged front view of one of the user terminals 22, illustrating one type of image that may be provided to a user on the LCD display 120. A map 156 covering a wide geographic area shown in FIG. 12A, is downloaded in digital form to the user terminal 22 via the satellite 20, and software within the user terminal restricts the image 156 to a smaller portion 158 in which the user is known to be located (based on position data from the GPS receiver 84). The user's position is marked by a cross 160, and the user's course (determined from successive GPS position measurements) is marked by a dashed line. If desired, the user's latitude, longitude, speed and direction may also be shown on the LCD display 120.

It will be understood that the GPS receiver 84 shown in FIG. 5 is only one type of geolocation receiver that can be use in connection with the present invention. Other types of geolocation receivers, such as LORAN receivers, can also be used. To improve the accuracy of the geolocation receiver, an altimeter may be provided in the user terminal to correct for the user's elevation. In some applications, it may also be possible to track the position of the user with a device other than a geolocation receiver, such as an inertial navigation unit.

Although the present invention has been described with reference to a preferred embodiment thereof, it will be understood that the invention is not limited to the details thereof. Various substitutions and modifications have been suggested in the foregoing description, and others will occur to those of ordinary skill in the art. All such substitutions and modifications are intended to be embraced within the scope of the invention as defined in the appended claims.

What is claimed is:

1. A system for providing location-specific data to a user, comprising:

a broadcast station for transmitting general data potentially usable by a plurality of users located at different geographic positions;

a relay satellite for relaying said general data from said broadcast station to said plurality of users; and a receiver terminal provided for each of said users, said receiver terminal comprising a broadcast receiver for receiving said general data from said relay satellite, a position determination unit for determining the geographic position of the user, and a processor for converting said general data to location-specific data based on the geographic position of said user as determined by said position determination unit.

2. A system as claimed in claim 1, wherein said position determination unit comprises a geolocation radio receiver.

3. A system as claimed in claim 1, wherein said receiver terminal further comprises an output device for visually presenting said location-specific data to said user.

4. A system as claimed in claim 1, wherein said general data transmitted by said broadcast station is encrypted, and wherein said receiver terminal is adapted to decrypt said data using a decryption key.

5. A system as claimed in claim 4, wherein said receiver terminal further comprises an input device for receiving said decryption key from an external source.

6. A system as claimed in claim 5, wherein said external source comprises a magnetically encoded card and said input device comprises a magnetic card reader.

7. A system as claimed in claim 1, wherein said general data comprises map data for a geographic region, and wherein said location-specific data comprises map data for a portion of said geographic region where said user is located.

8. A receiver terminal for providing location-specific data to a user, comprising:

a broadcast receiver for receiving general data transmitted by a broadcast station;

a position determination unit for determining the geographic position of the receiver terminal; and a processor for converting said general data to location-specific data based on the geographic position of the receiver terminal.

9. A receiver terminal as claimed in claim 8, wherein said position determination unit comprises a geolocation radio receiver.

10. A receiver terminal as claimed in claim 8, wherein said receiver terminal further comprises an output device for visually presenting said location-specific data to said user.

11. A receiver terminal as claimed in claim 8, wherein said general data transmitted by said broadcast station is encrypted, and wherein said receiver terminal is adapted to decrypt said image data using a decryption key.

12. A receiver terminal as claimed in claim 11, wherein said receiver terminal further comprises an input device for receiving said decryption key from an external source.

13. A receiver terminal as claimed in claim 12, wherein said external source comprises a magnetically encoded card and said input device comprises a magnetic card reader.

14. A receiver terminal as claimed in claim 8, wherein said general data comprises map data for a geographic region, and wherein said location-specific data comprises map data for a portion of said geographic region where said user is located.

15. A method for providing location-specific data to a user, comprising:

transmitting general data potentially usable by a plurality of users located at different geographic positions;

receiving said general data at one of said user locations;

determining the geographic position of said user; and converting said general data to location-specific data based on the geographic position of said user.

16. A method as claimed in claim 15, further comprising the step of relaying said transmitted general data through a satellite.

17. A method as claimed in claim 15, wherein the step of determining the geographic position of said user comprises receiving geolocation radio signals.

18. A method as claimed in claim 15, further comprising the step of displaying said location-specific data to said user.

19. A method as claimed in claim 15, wherein said transmitted general data is encrypted, and wherein said method further comprises the step of decrypting said data at said user location.

20. A method as claimed in claim 15, wherein said general data comprises map data for a geographic region, and wherein said location-specific data comprises map data for a portion of said geographic region where said user is located.

* * * * *